(12) United States Patent
Starr et al.

(10) Patent No.: US 11,151,080 B2
(45) Date of Patent: *Oct. 19, 2021

(54) AUTOMATED BACKUP OF NETWORK ATTACHED STORAGE

(71) Applicant: Spectra Logic Corporation, Boulder, CO (US)

(72) Inventors: Matthew Thomas Starr, Boulder, CO (US); David Lee Trachy, Longmont, CO (US)

(73) Assignee: Spectra Logic Corporation, Boulder, CO (US)

( * ) Notice: Subject to any disclaimer, the term of this patent is extended or adjusted under 35 U.S.C. 154(b) by 157 days.

This patent is subject to a terminal disclaimer.

(21) Appl. No.: 16/564,073

(22) Filed: Sep. 9, 2019

(65) Prior Publication Data

US 2020/0004724 A1    Jan. 2, 2020

Related U.S. Application Data

(63) Continuation of application No. 14/619,235, filed on Feb. 11, 2015, now Pat. No. 10,572,443.

(51) Int. Cl.
| | |
|---|---|
| *G06F 16/11* | (2019.01) |
| *G06F 11/14* | (2006.01) |
| *G06F 16/188* | (2019.01) |
| *G06F 16/182* | (2019.01) |

(52) U.S. Cl.
CPC ........ *G06F 16/128* (2019.01); *G06F 11/1451* (2013.01); *G06F 11/1461* (2013.01); *G06F 16/113* (2019.01); *G06F 16/188* (2019.01); *G06F 16/1824* (2019.01); *G06F 2201/84* (2013.01)

(58) Field of Classification Search
CPC .............. G06F 16/128; G06F 11/1461; G06F 11/1451; G06F 16/188; G06F 16/113; G06F 16/1824; G06F 2201/84; G06F 11/1464
USPC .......................................................... 707/634
See application file for complete search history.

(56) References Cited

U.S. PATENT DOCUMENTS

| | | |
|---|---|---|
| 5,963,963 A | 10/1999 | Schmuck et al. |
| 6,587,931 B1 | 7/2003 | Bauman et al. |
| 7,840,657 B2 | 11/2010 | Moore et al. |
| 8,086,634 B2 | 12/2011 | Mimatsu |
| 8,316,203 B2 | 11/2012 | Eguchi et al. |
| 8,745,329 B2 | 6/2014 | Kadatch et al. |
| 8,843,724 B2 | 12/2014 | Satoyama et al. |
| 2008/0177809 A1 | 7/2008 | Murayama et al. |
| 2010/0088335 A1 | 4/2010 | Mimatsu |
| 2012/0047265 A1* | 2/2012 | Agarwala ............. G06F 3/0665 709/226 |

(Continued)

*Primary Examiner* — Dangelino N Gortayo
(74) *Attorney, Agent, or Firm* — Kenneth Altshuler

(57) ABSTRACT

An apparatus and associated method that contemplate obtaining a server in selective communication with an archive storage controller (ASC) via a computer network, the ASC having access to a plurality of removable storage mediums (RSMs); storing data in the server; creating a logical storage volume in the ASC that has a logical relationship to the data stored in the server; and after the creating step, and without communication between the server and the ASC via the computer network, selecting at least one of the RSMs and dedicating the selected at least one RSM for retaining only data that is stored in the logical storage volume.

20 Claims, 12 Drawing Sheets

(56) References Cited

U.S. PATENT DOCUMENTS

| | | | |
|---|---|---|---|
| 2012/0115232 A1 | 5/2012 | Kanemaki et al. | |
| 2012/0151139 A1* | 6/2012 | Shiga | G06F 12/0646 |
| | | | 711/114 |
| 2012/0179779 A1 | 7/2012 | Awasthi | |
| 2012/0303594 A1* | 11/2012 | Mewhinney | G06F 11/3006 |
| | | | 707/692 |
| 2013/0318196 A1* | 11/2013 | Yamamoto | G06F 12/0893 |
| | | | 709/215 |
| 2014/0074899 A1* | 3/2014 | Halevy | G06F 3/0631 |
| | | | 707/827 |
| 2014/0258788 A1* | 9/2014 | Maruyama | G06F 11/3452 |
| | | | 714/47.3 |
| 2015/0067295 A1* | 3/2015 | Storm | G06F 3/0644 |
| | | | 711/171 |
| 2016/0124814 A1 | 5/2016 | Joseph et al. | |

* cited by examiner

AUTOMATED BACKUP OF NETWORK ATTACHED STORAGE

CROSS-REFERENCE TO RELATED APPLICATIONS

This application is a continuation application of U.S. Ser. No. 14/619,235, entitled AUTOMATED BACKUP OF NETWORK ATTACHED STORAGE filed Feb. 11, 2015.

FIELD OF THE INVENTION

The present embodiments relate generally to data management in distributed storage systems.

DESCRIPTION OF RELATED ART

Information and management computer applications are used extensively to track and manage data relevant to an enterprise, such as marketing and sales data, manufacturing data, inventory data, and the like. Typically, the application data resides in a centralized database within a distributed storage system, and in a format such as in Oracle, Informix, or SQL and the like. Local applications integrate remote clients and network servers to use and manage the application data, and to make the application data available to remote applications such as via remote function calls (RFCs).

The centralized location of the application data can be problematic in that it places on the enterprise owner the onus of maintaining complex computer systems in order to support the applications. For example, it has traditionally been necessary for the enterprise owner to acquire the knowledge necessary to purchase and maintain the physical storage devices that store the data. The maintenance includes implementing extensive and complex requirements that protect the stored data from file loss, from storage device failure, and even from entire installation failure. Where just file failure has occurred, it's advantageous to provide an end-user initiated recovery rather than requiring the enterprise owner's participation. When a storage failure requires complete recovery of a file system, it is preferred that removable storage mediums storing the backups are written for high performance streaming. Worst case, when an entire installation failure requires an offsite recovery, it is preferred that the removable storage mediums be ordered in a way making it efficient to remove them to the offsite location.

What is needed is a solution that replaces the complex and expensive backup requirements of the previously attempted solutions with a back-end archive controller having top level control of removable storage medium management. It is to that need that the embodiments of the present technology are directed.

SUMMARY OF THE INVENTION

Some embodiments of the claimed technology contemplate a method that includes: obtaining a server in selective communication with an archive storage controller (ASC) via a computer network, the ASC having access to a plurality of removable storage mediums (RSMs); storing data in the server; creating a logical storage container in the ASC that has a logical relationship to the data stored in the server; and after the creating step, and without communication between the server and the ASC via the computer network, selecting at least one of the RSMs and dedicating the selected at least one RSM for retaining only data that is stored in the logical storage container.

Some embodiments of the claimed technology contemplate a network-attached storage (NAS) device having a backup module that includes first computer instructions stored in a first computer memory and configured to be executed by a first computer processor to create backups of data stored in the NAS device. An ASC device is in communication with the NAS device via a network. The ASC device has a selection module that includes second computer instructions stored in a second computer memory and configured to be executed by a second computer processor, the ASC possessing a logical container that retains the backups. Independently of the NAS device, the ASC is arranged to select an RSM from a plurality of RSMs, and dedicates the at least one selected RSM to store only data retained in the logical container.

Some embodiments of the claimed technology contemplate an archive system having a frame, and a shelf system extending from the frame and sized to support a plurality of magazines. A plurality of tape cartridges is each removably supported in one of the plurality of magazines. A plurality of tape drives is each configured to engage one of the tape cartridges in a data transfer relationship. A transport system is configured to selectively move the tape cartridges between the shelf system and the plurality of tape drives. An ASC has a logical container, and the ASC has a selection module that includes computer instructions stored in computer memory and configured to be executed by a computer processor to define a plurality of the tape cartridges that are unused and to dedicate one of the unused tape cartridges for retaining only data from the logical container.

DETAILED DESCRIPTION

Initially, it is to be appreciated that this disclosure is by way of example only, not by limitation. The data management concepts herein are not limited to use or application with any specific system or method. Thus, although the instrumentalities described herein are for the convenience of explanation, shown and described with respect to exemplary embodiments, it will be appreciated that the principles herein may be applied equally in other types of storage systems and methods involving backing up and archiving data.

Figure 1:
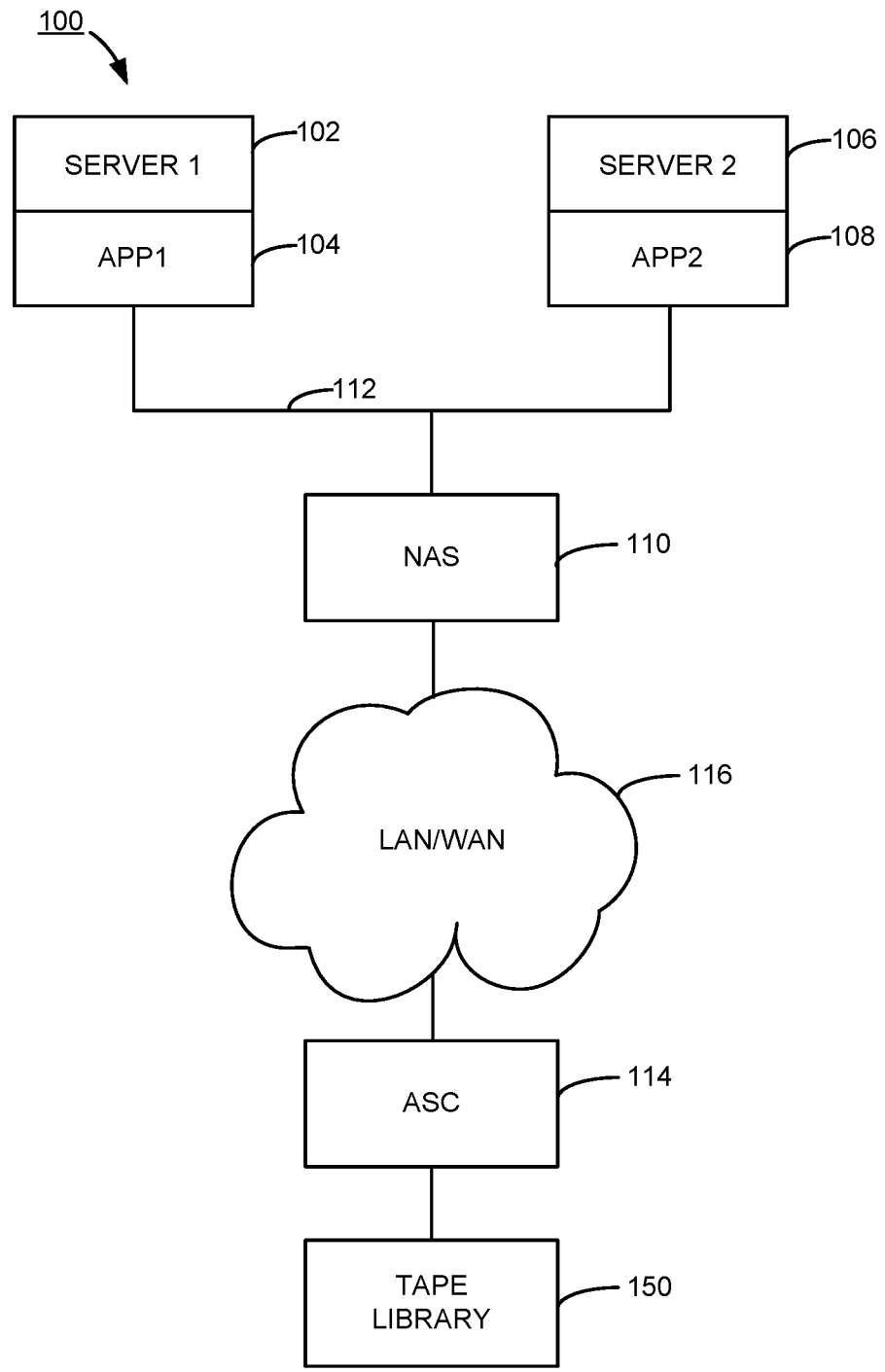
FIG. 1 is a simplified block depiction of a distributed storage system constructed in accordance with illustrative embodiments of the present technology.

To illustrate an exemplary environment in which preferred embodiments of the present technology can be advantageously practiced, FIG. 1 is a simplified depiction of a distributed storage system 100 that includes a first server 102 executing a first application (APP1) 104, and a second server 106 executing a second application (APP2) 108. The circuitries represented by the block depiction in FIG. 1 and otherwise throughout this description generally can be embodied in a single integrated circuit or can be distributed among a number of discrete circuits as desired.

A detailed description of the computer applications APP1, APP2 is unnecessary for the skilled artisan to understand the scope of the claimed technology. Generally, APP1 and APP2 can be any type of computer application such as but not limited to a point of sale application, an inventory application, a supply-chain application, a manufacturing application, and the like. The servers 102, 106 may communicate with each other, but both communicate with a network attached storage (NAS) device 110 via a local network 112. The NAS device 110 presents an independent storage file system to each server 102, 106. The servers 102, 106 store application data to and retrieve application data from the NAS 110 in the normal course of executing the respective applications APP1, APP2.

The NAS 110 cooperates with an archive storage controller (ASC) 114 to store backup copies (backups) of the application data residing in the NAS 110, and to manage the retention of the backups in accordance with the present technology. The NAS 110 and the ASC 114 communicate via a network 116 that can be characterized as Ethernet based switching network. The protocol utilized by the ASC 114 makes it well suited for placement at a remote site a distance away from the NAS 110. This protocol is compatible with the Internet and can be run over either private or public ISP networks.

Figure 2:
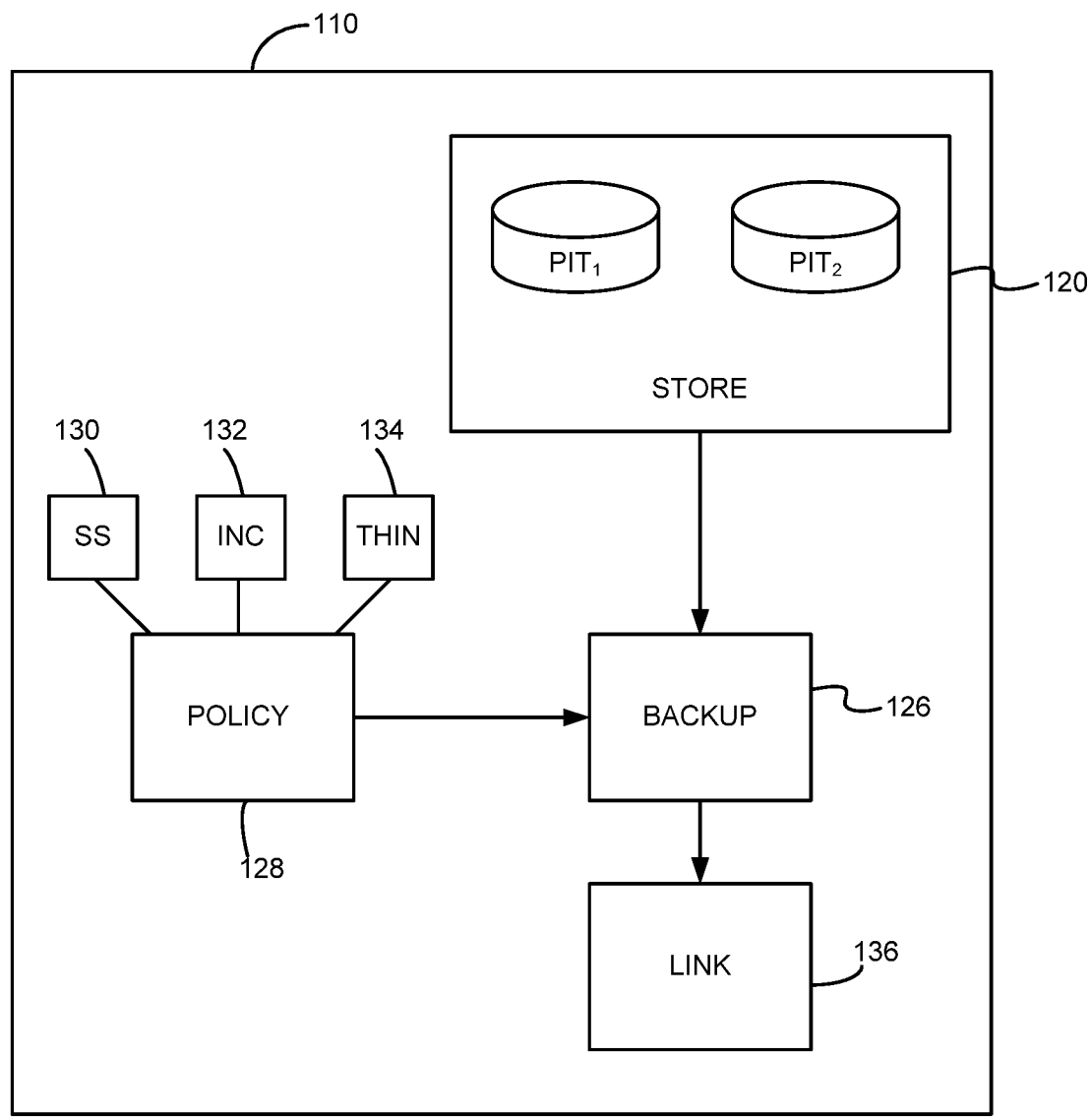
FIG. 2 is a simplified block depiction of the network attached storage device in FIG. 1.

FIG. 2 is a simplified block depiction of the NAS 110 constructed in accordance with illustrative embodiments of this technology. A data storage space 120 can be constructed of an array of storage drives (such as disk drives and solid state drives and the like) in conjunction with non-volatile memory (such as flash memory) and dynamic random access memory (DRAM) for buffering data during transfers. In these illustrative embodiments the NAS 110 also has a backup module 126 that executes computer instructions stored in computer memory to provide top level control of what backups of the application data in the NAS 110 are obtained, and how long the backups are retained. To that end, the backup module 126 enforces policy rules 128 that are established by an administrator (a skilled information technology person managing the storage system 100). In these illustrative embodiments the administrator controls three parametric inputs that define the backup policy rules 128. Although in these illustrative embodiments the backup policy rules 128 are the same for both the APP1 data and the APP2 data, in alternative embodiments the APP1 data and the APP2 data can have different, individual backup policy rules $128_i$.

One administrator-controlled policy rule 128 is a snapshot policy (SS) 130 that backs up an entire set of the application data residing in the NAS 110 (snapshot copy) at a particular point-in-time (PIT). For purposes of this example, the SS policy 130 obtains both a snapshot copy of the APP1 data residing in the NAS 110 and a snapshot copy of the APP2 data residing in the NAS 110. Optionally, each application APP1, APP2 puts itself in a consistent state (temporary suspension of I/O activity) long enough to obtain the respective snapshot copy at the particular PIT. Typically a snapshot copy is a relatively large data transfer, so preferably it is scheduled to occur after normal operating hours to prevent adversely affecting throughput performance of the system 100. For the illustrative purposes of this description, the SS policy 130 can be programmed to obtain a snapshot copy for each application APP1, APP2 beginning each Sunday (such as beginning at noon). After the snapshot copies are obtained, each application APP1, APP2 resumes running in normal mode on the standard storage volume.

Another administrator-controlled policy rule 128 is an incremental (INC) policy 132 that obtains incremental updates of the application data between two consecutive snapshot copies. For purposes of this description the INC policy 132 obtains an incremental update every day during an off-peak time (such as at 9 PM) each day Monday through Saturday. Each incremental update includes the files that have been added or modified in the application data in comparison to a previous record. That previous record can be the most recent incremental update or it can be the most recent snapshot copy. For example, the incremental update for Wednesday can include only the file changes in the application data as compared to the incremental update for Tuesday, the previous day. Alternatively, the incremental update for Wednesday can include all of the file changes in the application data as compared to the snapshot copy obtained the previous Sunday.

Yet another administrator-controlled policy rule 128 is a thinning (THIN) policy 134 that defines retention time for the backups. For purposes of this illustrative example the THIN policy 134 provides that each weekly snapshot copy and all its corresponding incremental updates are retained for an entire fiscal month. At the beginning of the next month, only the backups for the last week of the previous month are retained. At the beginning of the next fiscal quarter, only the backups for the last week of the previous quarter are retained. Ultimately, no backups are retained that have aged more than seven years old.

The ASC 114 (FIG. 1) provides a cloud storage compatible interface for copying the backups from the NAS 110 to the ASC 114. For example, a link application 136 in the NAS 110 can send data via the network 116 through implementation of representational state transfer (REST) calls from the link module 136 via object-oriented language. That is, the link application 136 can send and receive data via connection with the ASC 114 configured as a native hypertext transfer protocol (HTTP) device. The NAS 110 connection with the ASC 114 is built into the link module 136 so that both sending data to and receiving data from the ASC 114 is self-contained and automatically established by the link application 136 when necessary. Generally, the link application 136 maps requests/responses to REST request/response streams to carry out predetermined transfers of data.

Figure 3:
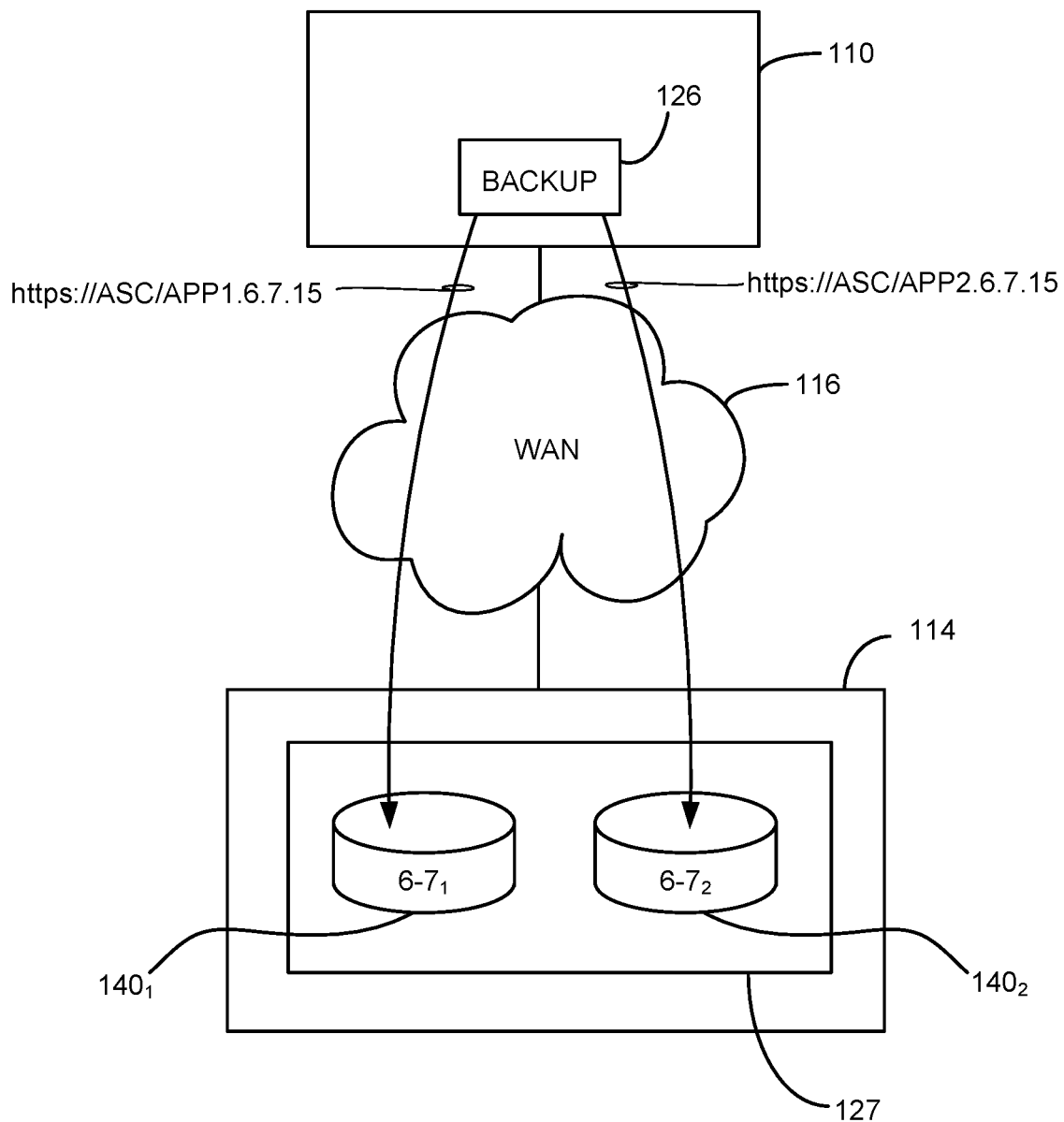
FIG. 3 is a simplified block depiction of the network attached storage device creating logical volumes (containers) in the archive storage controller for APP1 and APP2 backups.
Figure 4:
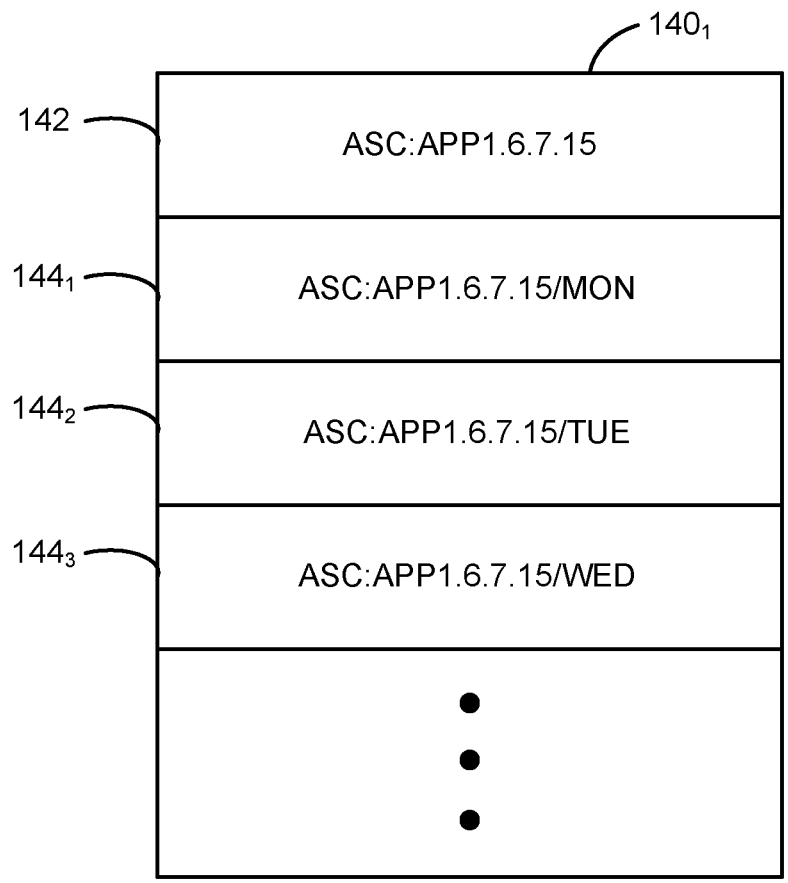
FIG. 4 is a diagrammatic depiction of contents of the container in the archive storage controller for the APP1 backups at a particular point in time.

Turning to FIG. 3, this permits the backup module 126 to logically organize the backups in a buffer memory 127 contained in the ASC 114. For purposes of this description and meaning of the claims, that logical storage hierarchy is referred to as creating a logical container, or more generally creating a container 140 for the backups in the buffer 127. Each container 140 and its contents can be identified by strategic use of addressable HTTP uniform resource identifiers (URIs). For this example, it is presumed that at the PIT of Sunday, Jun. 7, 2015 (6-7), snapshot copies are obtained for the applications APP1, APP2 in accordance with the policy rules 128. The backup module 126 copies the APP1 snapshot copy to a newly created container $140_1$ by the PUT command https://ASC.APP1.6.7.15. The container $140_1$ is labeled in terms of its snapshot copy PIT and application number, $6-7_1$ (which is June $7^{th}$ for application APP1), for this example. Similarly, the backup module 126 copies the APP2 snapshot to a newly created container $140_2$ by the PUT command https://ASC.APP2.6.7.15, and so labeled $6-7_2$ (which is June $7^{th}$ for application APP2) for this example. FIG. 4 depicts a subsequent PIT when the contents of the container $140_1$ include the June $7^{th}$ snapshot in the root directory 142 of the container $140_1$, and incremental updates for each of Monday, Tuesday, and Wednesday of that week in respective subdirectories 144 of the container $140_1$. Using a custom file explorer, end users can simply scan all object containers for the dates of interest and explore for the files to be recovered. Once identified, these files can then be simply dragged-and-dropped back to any primary storage system. Entire file systems can be recovered by copying an entire logical container, for the date of interest, back to a fresh storage system.

Each container 140 is only a temporary repository for the backups, which in certain embodiments, are only created when data is received at the ASC 114. Eventually the ASC 114 further transfers the buffered backups to an external storage device. The NAS 110 only transfers backups to the ASC 114. That is, the NAS 110 is unaware that any external storage behind the ASC 114 even exists. Control of the transfer of the backups from the ASC 114 to the external storage is exclusively performed by the ASC 114, with no communication between the NAS 110 and the ASC 114 via the network 116. Returning momentarily to FIG. 1, in these illustrative embodiments the ASC 114 transfers the buffered backups to a tape library 150, although the contemplated embodiments are not so limited. Again, in these illustrative embodiments the NAS 110 transfers the backups to the ASC 114 without knowledge or awareness that the tape library 150 even exists. In alternative embodiments the ASC 114 can further transfer the buffered backups to a different type of data storage system, such as to an array of data storage drives and the like.

Figure 5A:
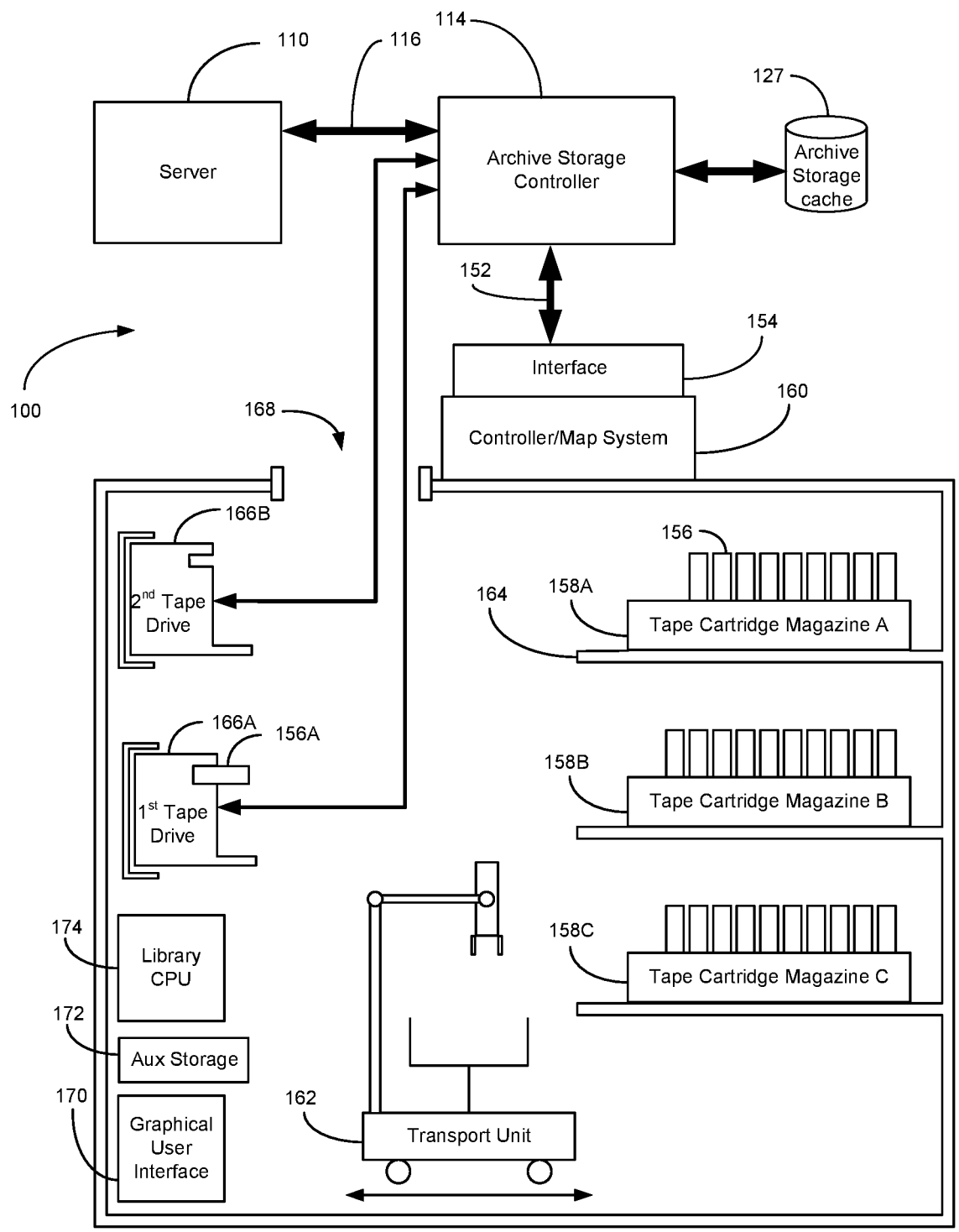
FIG. 5A is a diagrammatic depiction of the system of FIG. 1.
Figure 5B:
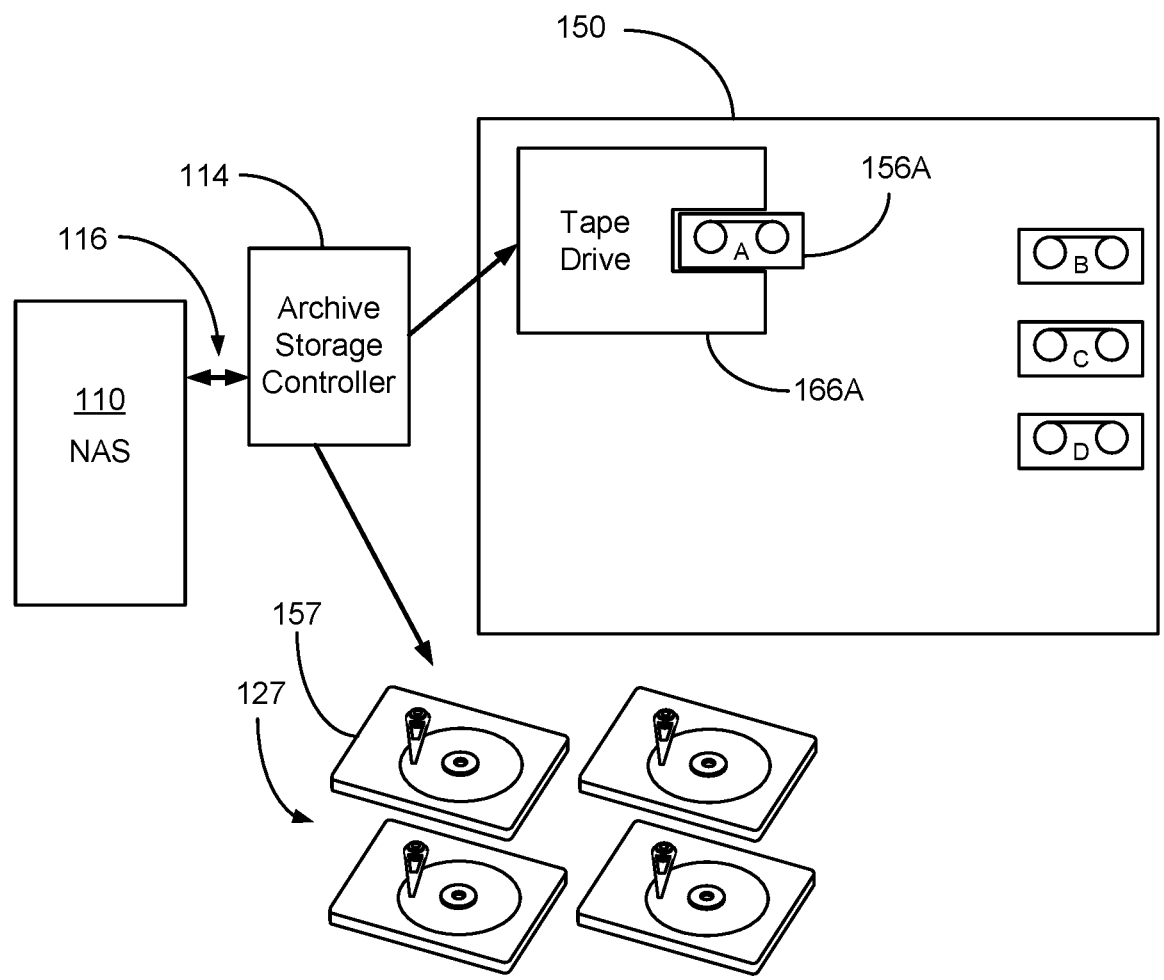
FIG. 5B is a simplified depiction of a portion of FIG. 5A.

FIGS. 5A and 5B depict illustrative embodiments of a tape library 150 (FIG. 1) suited for use with this technology. The tape library 150 communicates with the ASC 114 via a communication path 152 and interface 154. [0007] The NAS 110 transfers backups to the ASC 114 without regard to the ASC 114 operations with the tape library 150. Although the ASC 114 includes cache 127 for temporarily storing the backups from the NAS 110, it is the ASC 114 alone without communication from the NAS 110 that controls the storage operations of the tape library 150. The tape library 150 is backend bulk storage with a much larger data storage capacity than the ASC 114.

Staying with FIG. 5A and further considering FIG. 5B that illustratively depicts a simplified diagram of the tape library 150 and the components that can be used as exemplary elements for embodiments described herein. In these illustrative embodiments the cache 127 can be constructed of a plurality of magnetic disk drives 157. The set of related tape cartridges 156A, B, C, D are referred to as being logically related to backups contained in the ASC 114 because they can be from the same application (such as APP1, APP2) in these illustrative embodiments. In alternative embodiments they can be logically related in terms of a particular server, a particular customer, a particular timeframe, a particular subject matter, and the like.

The plurality of tape cartridges 156 are referred to individually as removable storage mediums because they are each selectively moveable within, out of, and into the tape library 150. In alternative embodiments the removable storage mediums can be a different form, such as optical disks, optical disk cartridges, magnetic disks, optical-magnetic disks, mobile solid state memory devices, and the like. In these embodiments a plurality of tape cartridges is contained in each of a plurality of magazines 158, such as magazine "A" labeled 158A. Each tape cartridge 158 has an enclosure containing at least one reel and a magnetic tape wound around the reel.

Here, the tape library 150 has a map module 160 executing computer instructions stored in computer memory to logically map the physical locations of each tape cartridge 156. The logical map is used by the ASC 114 to maintain knowledge of the physical locations of the tape cartridges 156 as they are selectively moved around. A robotic transporter 162 selectively moves the magazines 158 between a shelf 164 and a tape drive 166. Particularly, tape cartridge 156A is depicted as being loaded into the tape drive 166A so that the tape library 150 can transfer data with the tape cartridge 156A. Hence, the tape cartridges 156 are referred to as removable storage mediums also because they can be moved into and removed from a data transfer relationship with a read/write device.

The tape library 150 can have a portal 168 through which the tape cartridges 156 can be physically moved out of or into the collective set of tape cartridges 156 contained in the tape library 150. In these embodiments, the tape library 150 has a graphical user interface 170 and an auxiliary storage 172. The auxiliary storage 172 can be one or more data storage drives, solid-state memory, or other non-volatile memory devices capable of storing digital data. The library 150 further has a processing unit (CPU) 174 having top-level control of the various computer operations within the tape library 150 and of external communications such as with the ASC 114 in these illustrative embodiments.

Figure 6:
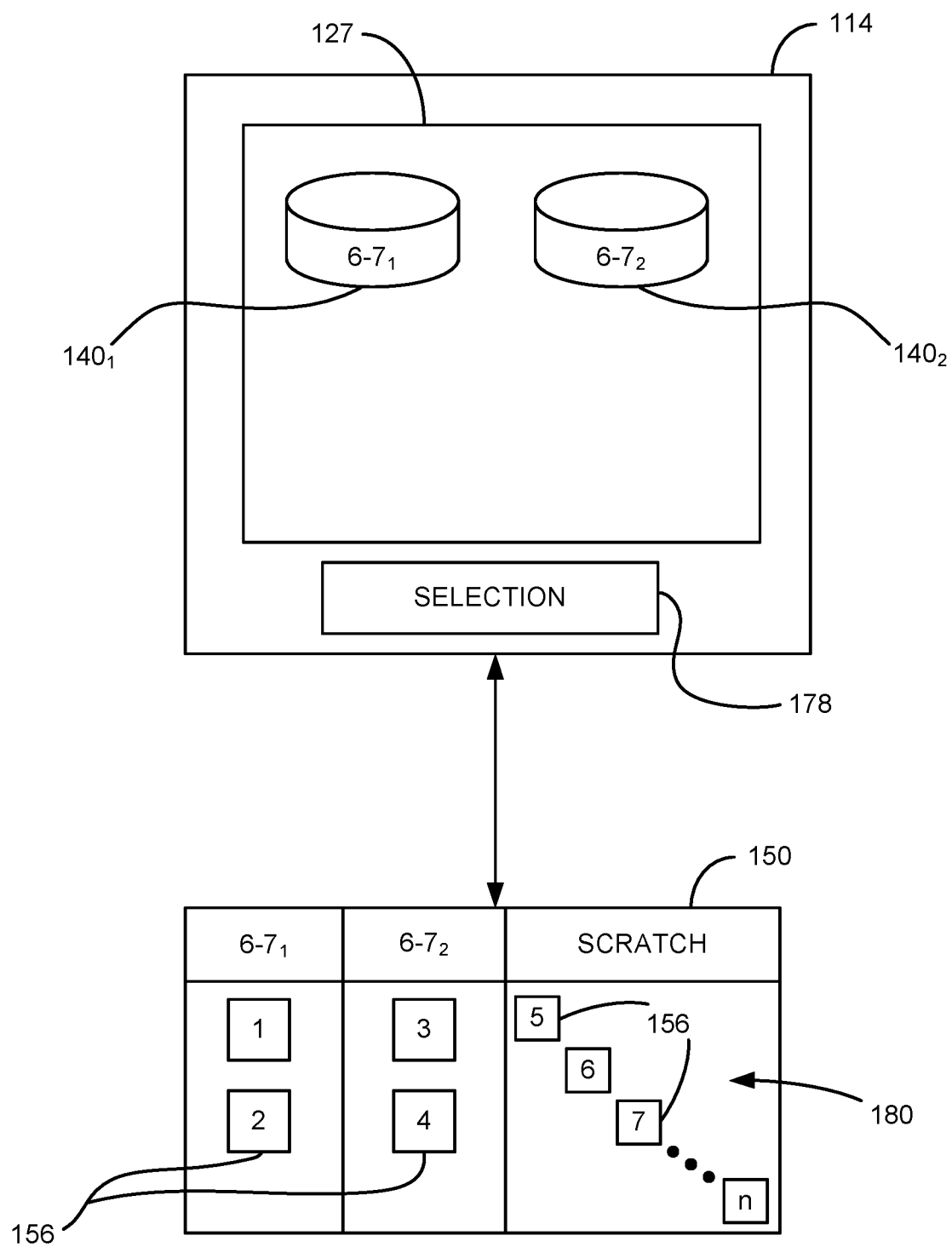
FIG. 6 is a diagrammatic depiction of the selection module selecting tape cartridges from the scratch pool for dedicating them to the containers in the archive storage controller.

FIG. 6 diagrammatically depicts the ASC 114 has a selection module 178 that includes computer instructions stored in a computer memory and executable by a computer processor to assign one or more of the tape cartridges 156 in the tape library 150 to a logical container 140. The selection module 178 is made aware of a scratch pool 180 of presently unused tape cartridges 156 in the tape library 150. The tape cartridges 156 are numerically numbered in the depicted embodiments to explain tracking their usage in and out of the scratch pool 180. For example, $156_1$ refers to the tape cartridge 156 labeled as "1" in the drawings. The selection module 178 responds to a creation of a new container 140 by selecting one or more tape cartridges 156 from the scratch pool 180 and dedicating it/them for use only to store backups from the container to which assignment is made. The assignment removes the selected (and now assigned) tape cartridge(s) 156 from the scratch pool 180. The number of tape cartridges 156 that the selection module 178 assigns depends on the size of the backups in the container 140 to which assignment is made. The selection module 178 assigns tape cartridges 156 from the scratch pool 180 throughout the life of the corresponding container 140 on an as-needed basis. FIG. 6 depicts the same state of the ASC 114 as in FIG. 3; the containers $140_1$, $140_2$ for the week beginning on June $7^{th}$ have been created. The selection module 178 has selected four tape cartridges 156 from the scratch pool 180 and assigned two of them $156_1$, $156_2$ to the container $140_1$ labeled $6-7_1$ (June $7^{th}$ snapshot copy for APP1 data), and assigned the other two $156_3$, $156_4$ to the container $140_2$ labeled $6-7_2$. At least one of the tape cartridges $156_1$, $156_2$ contain a full volume data copy for the NAS 110 in accordance with the backup policy 128.

Figure 7:
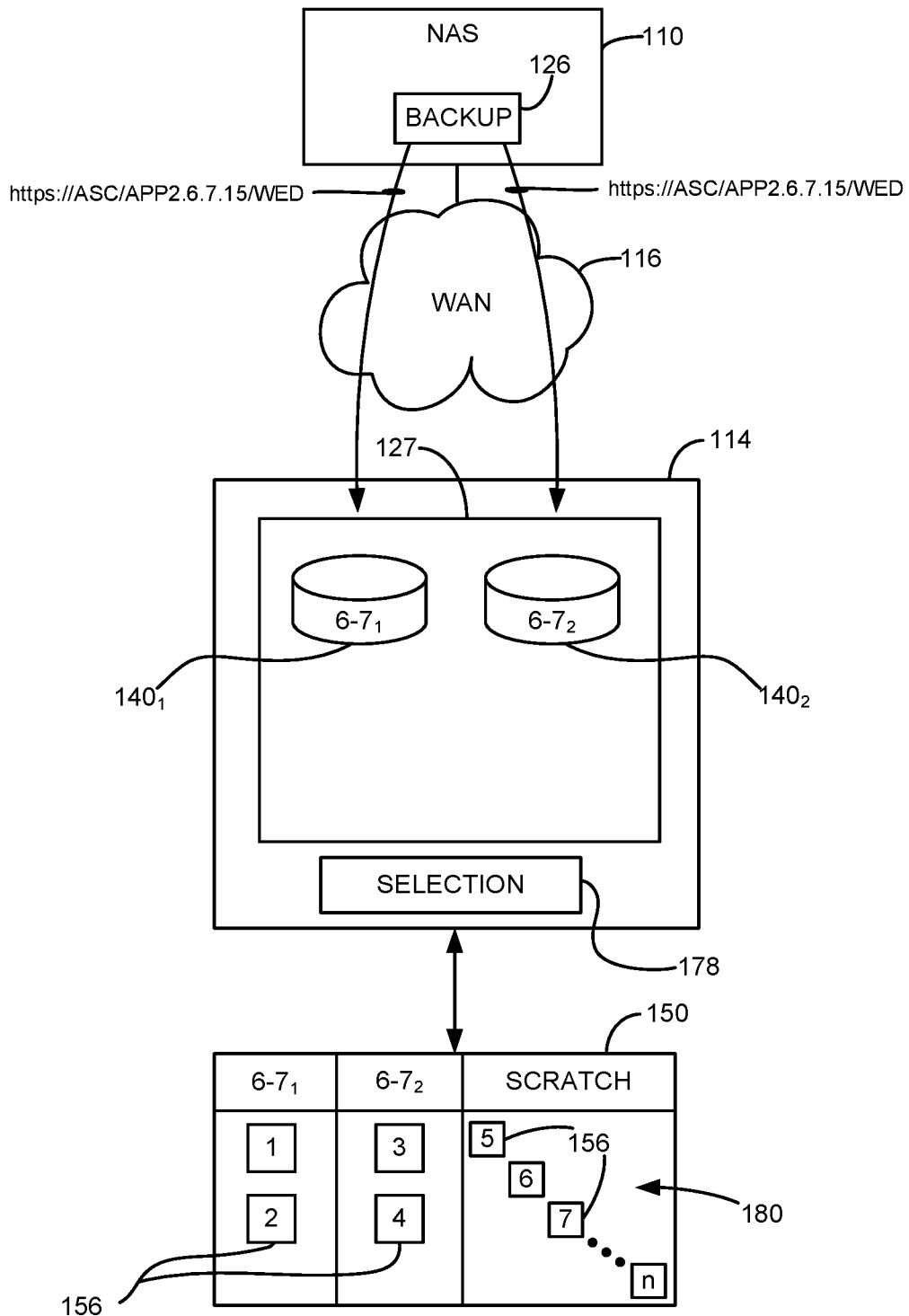
FIG. 7 is similar to FIG. 3 but depicting a subsequent point in time when the network attached storage device is transferring incremental updates of the APP1 and APP2 data.

FIG. 7 depicts the backup module 126 backing up the Wednesday incremental updates (for APP1 and APP2) to the containers 140 that were previously created by storing the June $7^{th}$ snapshot copies. The backup module 126 is programmed to store the incremental updates in respective subdirectories of the containers 140 by the PUT command https://ASC/APP1.6.7.15/WEDNESDAY to the container labeled $6-7_1$, and the PUT command https://ASC/APP2.6.7.15/WEDNESDAY to the container labeled $6-7_2$. After completion of those commands the container labeled $6-7_1$ contains the backups depicted in FIG. 4; the snapshot copy in the root directory 142 and the daily updates for Monday through Wednesday in the respective subdirectories 144. Note that the selection module 178 at this point has not assigned any more tape cartridges 156 to the containers 140 from what was originally assigned. That means two tape cartridges 156 provide more than enough storage capacity for what is stored to the containers 140 so far. In addition, a policy can be specified that will eject tape cartridges 156 out of the tape library 150 either each day or after each week. This allows for the tape cartridges 156 to be taken offsite to protect against a site failure.

Figure 8:
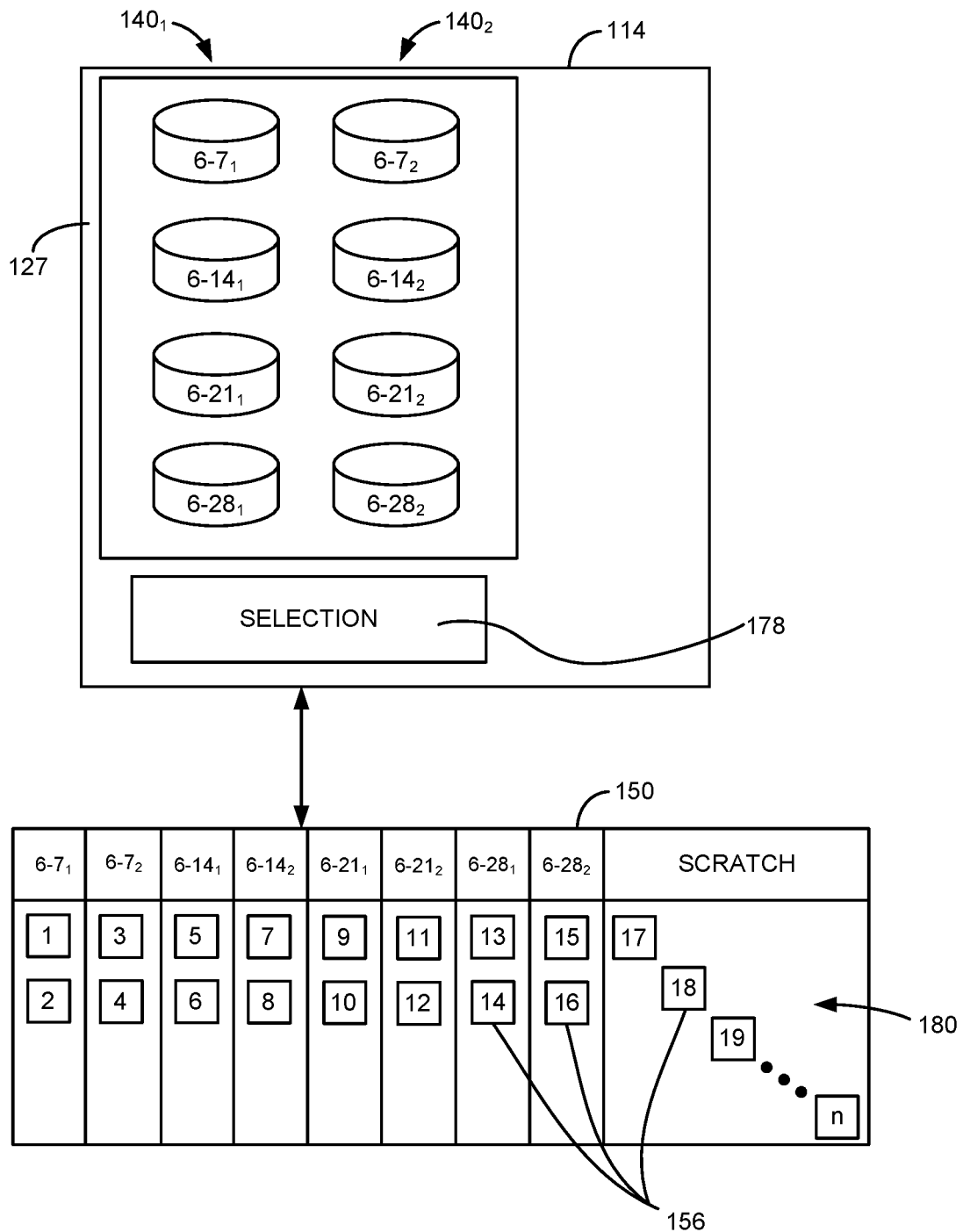
FIG. 8 is similar to FIG. 6 but at a subsequent point in time during the last week of the month.

For purposes of furthering the example already started, it is presumed that the month of June in the year 2015 consists of fiscal weeks 24, 25, 26, and 27. Those fiscal weeks include Sundays (for purposes of obtaining snapshot copies) on June $7^{th}$, June $14^{th}$, June $21^{st}$, and June $28^{th}$. FIG. 8 fast-forwards to a PIT during the last week of June showing the state of the ASC 114 includes additional containers 140 having been created for the weekly snapshot copies, labeled 6-14, 6-21, and 6-28. During the second week the selection module 178 assigned storage cartridges $156_5$, $156_6$ to the container 140 labeled $6-14_1$, and assigned storage cartridges $156_7$, $156_8$ to the container 140 labeled $6-14_2$. During the third week the selection module 178 assigned storage cartridges $156_9$, $156_{10}$ to the container 140 labeled $6-21_1$, and assigned storage cartridges $156_{11}$, $156_{12}$ to the container 140 labeled $6-21_2$. Finally during the fourth week the selection module 178 assigned storage cartridges $156_{13}$, $156_{14}$ to the container 140 labeled $6-28_1$, and assigned storage cartridges $156_{15}$, $156_{16}$ to the container 140 labeled $6-28_2$. For simplifying this example, storage cartridges $156_1$ through $156_{16}$ are depicted as having been withdrawn from the scratch pool 180 for assignment to containers 140, leaving storage cartridges $156_{17}$ through $156_n$ available in the scratch pool 180. This does not mean to imply that any certain order of selecting the tape cartridges 156 is necessary in this technology; rather, the assignments can be entirely random or they can be selected to normalize a utilization of the cartridges 156 in the scratch pool 180, and the like.

Figure 9:
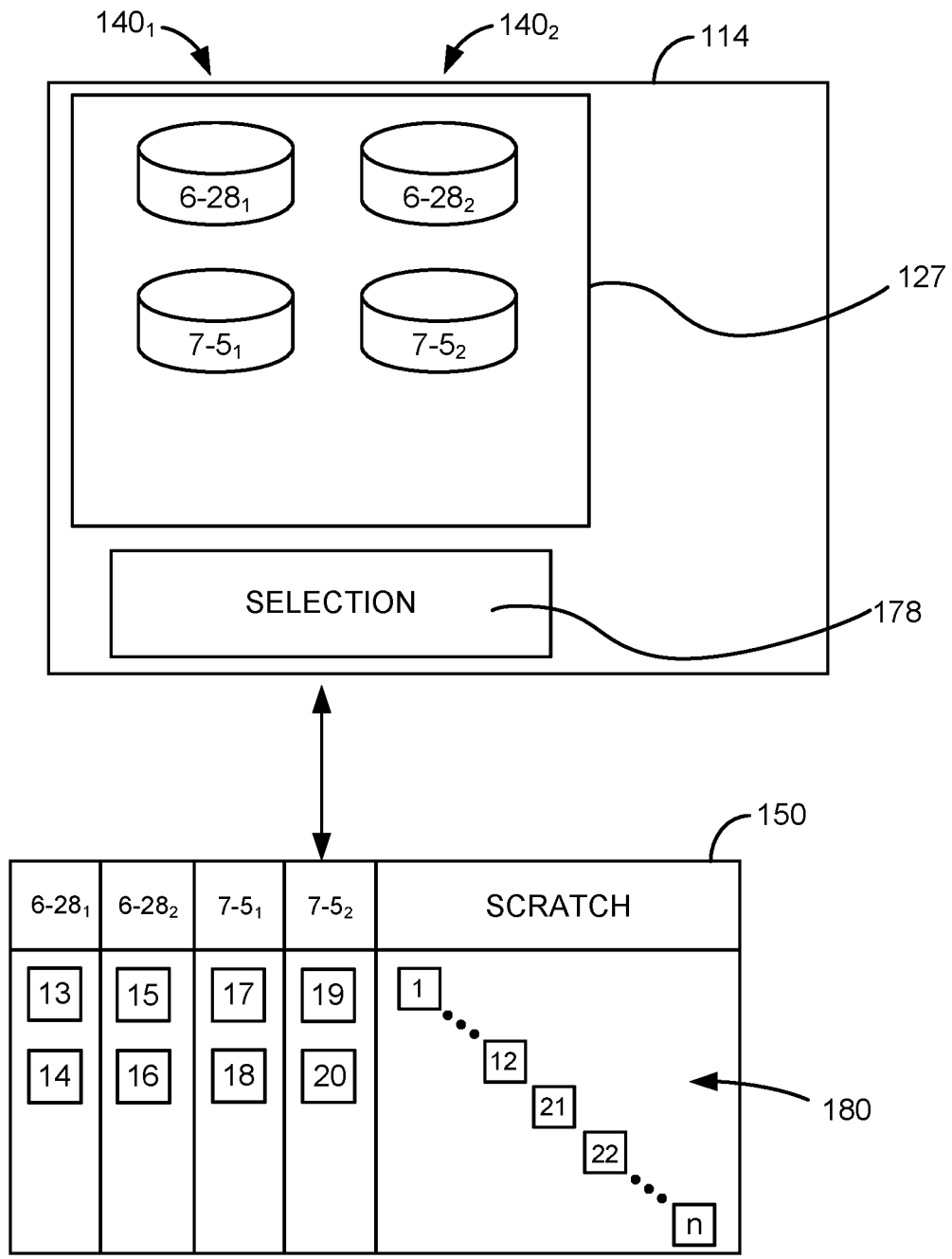
FIG. 9 is similar to FIG. 8 but at a subsequent point in time during the first week of the next month.

FIG. 9 depicts a PIT during the next week, the first fiscal week of July, for which the backup module 126 has created the containers 140 labeled $7-5_1$, $7-5_2$ (because Sunday that week is July $5^{th}$) in a continuation of the backup operations of this technology as described above. Also as described above, the selection module 178 has assigned storage cartridges $156_{17}$, $156_{18}$ to the container 140 labeled $7-5_1$, and assigned storage cartridges $156_{19}$, $156_{20}$ to the container 140 labeled $7-5_2$. However, in accordance with the THIN policy 134 (FIG. 2) the backup module 126 has also sent DELETE commands to delete all the containers 140 in the ASC 114 except for the last week's containers labeled $6-28_1$, $6-28_2$. That is, the backup module 126 has deleted the containers 140, meaning deleted all the backups contained in the containers labeled 6-7, 6-14, and 6-21. The selection module 178 responds to the deletion of a container by returning the corresponding assigned tape cartridges 156 to the scratch pool 180. Thus, at this PIT the scratch pool 180 includes the returned tape cartridges $156_1$ through $156_{12}$, and tape cartridges $156_{13}$ through $156_{20}$ are assigned to the various containers 140.

Figure 10:
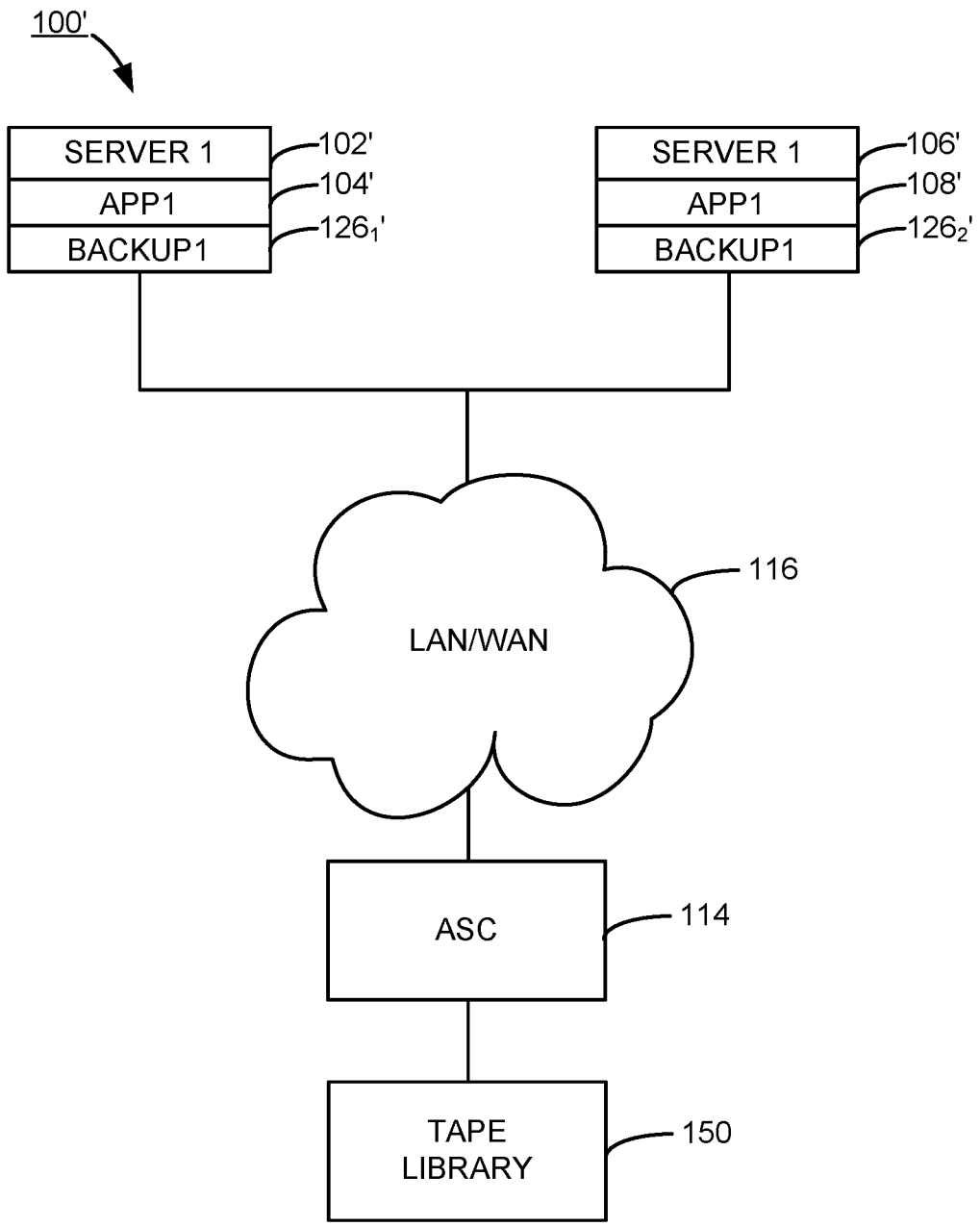
FIG. 10 is a block depiction of a distributed storage system constructed in accordance with alternative embodiments of this technology.

Thus far, the description of this technology has included the backup module 126 residing in the NAS device 110, although the contemplated embodiments are not so limited. FIG. 10 depicts alternative embodiments of this technology in which each of the servers 102', 106' contains a backup module $126_1'$, $126_2'$ that controls backups for the resident application and its associated storage. In these illustrative embodiments the servers 102', 106' access the ASC 114 through the network 116. In this embodiment the ASC 114 is in a different physical site than that of the servers 102, 106.

Figure 11:
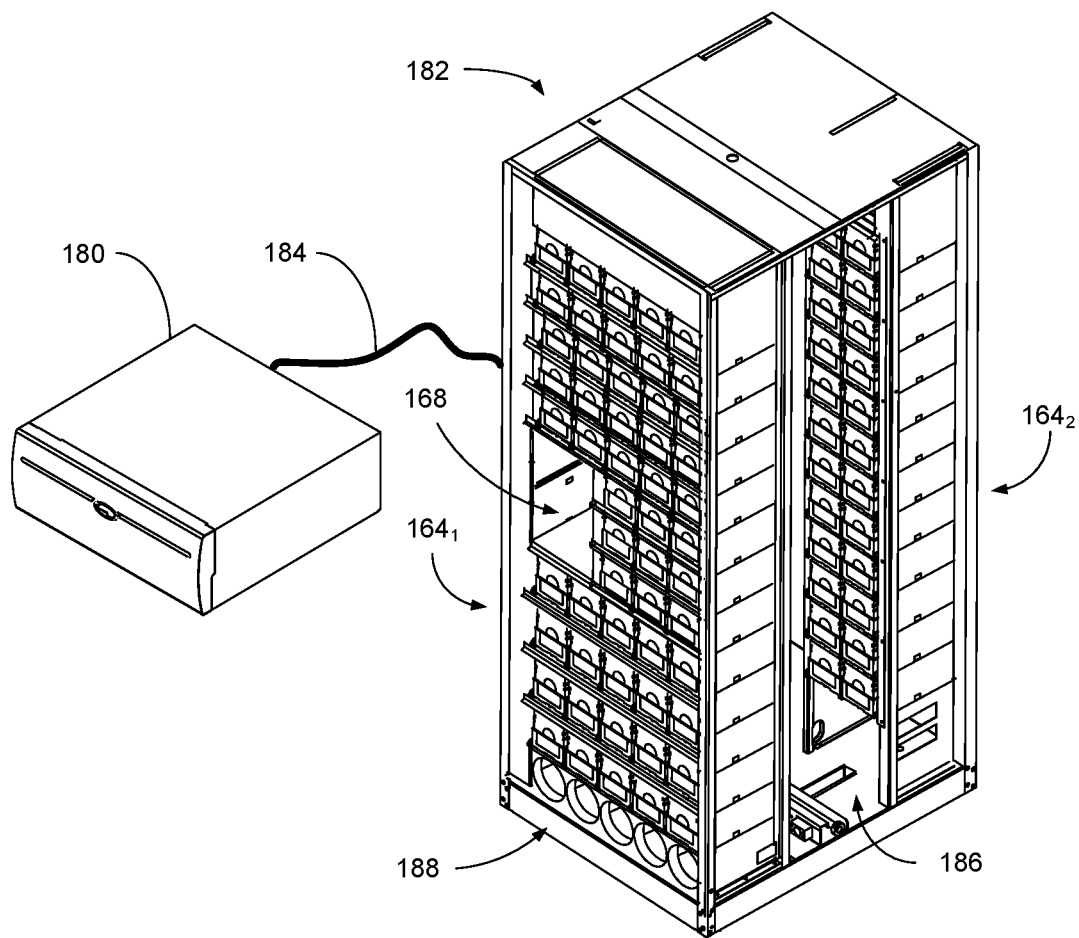
FIG. 11 is an isometric depiction of the system of FIG. 5.

Embodiments of the present invention can be commercially practiced in a Black Pearl archive storage system that possesses a Spectra Logic T-Finity tape cartridge library on the backend manufactured by Spectra Logic of Boulder Colo. FIG. 11 shows a commercial embodiment of one Black Pearl archive storage system 180 communicatively linked with the T-Finity unit 182 via a cable 184. The T-Finity unit 182 is depicted without an enclosure. The T-Finity unit 182 as depicted is a single cabinet, but in alternative embodiments multiple cabinets can be combined as necessary to make an expanded tape library or to expand an existing tape library. The Black Pearl archive storage system 180 possesses the ASC (not depicted) and a plurality of data storage drives (not shown) and software that facilitates receiving data from a server (not shown), caching that data in at least one of the plurality of data storage drives, and storing that data to tape cartridges in the T-Finity library 182. The Black Pearl archive storage system 180 is capable of handling all tape related storage commands without the server's involvement. The T-Finity unit 182 comprises a first and second shelf system $164_1$, $164_2$ that are adapted to support a plurality of the removable storage mediums, such as the tape cartridge magazines 158 in these illustrative embodiments. The second shelf system $164_2$ has at least one tape drive (not depicted) adapted to read and write data to and from a tape cartridge. Functionally interposed between the first and second shelf system $164_1$, $164_2$ is a magazine transport space 186. The magazine transport space 186 provides adequate space for a tape cartridge magazine (not depicted) to be moved, via a magazine transport (not depicted), from a position in the shelf system $164_1$, $164_2$ to a tape drive (not depicted). Tape cartridge magazines 158 can be transferred into and out from the T-Finity library via the entry/exit port 168. The T-Finity tape library 182 includes a means for cooling as shown by the fans 188 located at the base.

Though embodiments described herein are directed to removable storage media allocated to retain data dedicated to logical containers, it is contemplated that the logical containers can be retained in one or more disk drives in a JBOD or disk drive bank.

It is to be understood that even though numerous characteristics and advantages of various embodiments of the present technology have been set forth in the foregoing description, together with the details of the structure and function of various embodiments of the invention, this disclosure is illustrative only, and changes may be made in detail, especially in matters of structure and arrangement of parts within the principles of the present technology to the full extent indicated by the broad general meaning of the terms in which the appended claims are expressed. For example, multiple or even predetermined pluralities of scratch pools 180 can be managed in the container selection for example, while still maintaining substantially the same functionality without departing from the scope and spirit of the claimed invention. Another example can include using these techniques across multiple library partitions, while still maintaining substantially the same functionality without departing from the scope and spirit of the claimed invention. Further, though communication is described herein as between an ASC and a tape library, communication can be received directly by a tape drive, via the interface device 154, for example, without departing from the scope and spirit of the claimed invention. Further, for purposes of illustration, a first and second tape drive 166 and tape cartridges 156 are used herein to simplify the description for a plurality of tape drives 166 and tape cartridges 156. Finally, although the preferred embodiments described herein are directed to tape drive systems, and related technology, it will be appreciated by those skilled in the art that the claimed technology can be applied to other systems, without departing from the spirit and scope of the present technology.

It will be clear that the claimed technology is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the claimed technology disclosed and as defined in the appended claims.

It is to be understood that even though numerous characteristics and advantages of various aspects have been set forth in the foregoing description, together with details of the structure and function, this disclosure is illustrative only, and changes may be made in detail, especially in matters of structure and arrangement to the full extent indicated by the broad general meaning of the terms in which the appended claims are expressed.

What is claimed is:

1. A method comprising:
providing a server in communication with an archive storage controller (ASC) via a computer network, the ASC having access to a plurality of removable storage mediums (RSMs);
storing data in the server;
generating a logical storage container in the ASC that has a logical relationship to the data stored in the server;
after the generating step, transferring the data from the server to the logical storage container;
storing the data to the logical storage container as container data;
after the generating step, selecting a group of RSMs from the plurality of RSMs, wherein there is no communication between the server and the ASC via the computer network in said selecting step, the group of RSMs having an RSM group storage capacity; and
dedicating the group of RSMs to being only used with the logical storage container, said data having a data size that is less than said RSM group storage capacity.

2. The method of claim 1 further comprising storing at least a portion of the data from the container data to a first RSM, the portion less than a first RSM storage capacity of the RSM, a remainder of said first RSM storage capacity unavailable for any other data not from the logical storage container while the portion is stored in the first RSM.

3. The method of claim 1 wherein the selecting step is after the creating step.

4. The method of claim 1 wherein said group of RSMs is selected based on how much data storage capacity is required to store said data.

5. The method of claim 1 further comprising deleting the data from the server after the transferring step is accomplished.

6. The method of claim 1 further comprising deleting the data from the logical storage container after the storing step.

7. The method of claim 1 wherein during the transferring step, the server has no knowledge of any other storage device that is cooperating with said logical storage container.

8. The method of claim 1 further comprising a computer program, in the ASC, assigning said group of RSMs exclusively to said data in said logical storage container.

9. The method of claim 1 further comprising a computer program in the ASC, the computer program instructing said group of RSMs to store said data exclusively from said logical storage container.

10. A method comprising:
providing a server in communication with an archive storage controller (ASC) via a computer network, the ASC having access to a plurality of removable storage mediums (RSMs);
storing data in the server;
generating a logical storage container in the ASC that has a logical relationship to the data stored in the server;
after the generating step, transferring the data from the server to the logical storage container;
storing the data to the logical storage container as container data;
after the generating step, selecting a first RSM and a second RSM of the plurality of RSMs, the selecting step is accomplished without communication between the server and the ASC by way of the computer network; and
assigning the first RSM and the second RSM uniquely to the logical storage container prior to storing at least a portion of the container data to the first RSM and the second RSM.

11. The method of claim 10 further comprising storing at least a portion of said container data to the first RSM and the second RSM.

12. The method of claim 11 wherein neither the first RSM nor the second RSM ever retain data from another storage container while said data from said storage container is present in said first RSM and said second RSM.

13. The method of claim 11 wherein any storage capacity unused in either said first RSM or said second RSM is never used to retain other data from another data source.

14. The method of claim 11 wherein the server creates the logical storage container in the ASC via a hypertext transfer protocol command.

15. The method of claim 11 wherein the first logical container contains a plurality of subdirectories, each containing an incremental update obtained at different points in time between a first snapshot copy of the data stored in the server at a first point in time and a second snapshot copy of the data stored in the server at a second point in time.

16. A method comprising:
providing a server in communication with an archive storage controller (ASC) via a computer network, the ASC having access to a plurality of removable storage mediums (RSMs);
storing data to a server;
generating a logical storage container in said ASC, said logical container having a logical relationship to the data stored in the server;
storing the data transferred from the server to the logical storage container;
said ASC selecting a group of RSMs, wherein there is no communication over said computer network between said ASC and said server during said selecting step;
assigning said group of RSMs only to said logical storage container; and
storing the data to the group of RSMs, the data has a data quantity that is less than a group RSM storage capacity of the group of RSMs, a remainder of said group RSM storage capacity is unavailable for any other data not from the logical storage container while the data is stored in the group of RSMs.

17. The method of claim 16 wherein any group RSM storage capacity unused is never used to retain other data from another data source.

18. The method of claim 16 wherein the selecting step is done after the generating step.

19. The method of claim 16 wherein said group of RSMs is selected based on how much data storage capacity is required to store said data.

20. The method of claim 16 further comprising a computer program in the ASC, the computer program instructing said group of RSMs to store said data exclusively from said logical storage container.

* * * * *